US007177724B2

(12) United States Patent
Cantello et al.

(10) Patent No.: US 7,177,724 B2
(45) Date of Patent: Feb. 13, 2007

(54) PORTABLE TERMINAL FOR CONTROLLING, PROGRAMMING AND/OR TEACHING ROBOTS OR SIMILAR AUTOMATIC APPARATUSES

(75) Inventors: Giorgio Cantello, Turin (IT); Davide Ferla, Beinasco (IT); Luca Lachello, Turin (IT); Renzo Calcagno, Alpignano (IT); Gianluca Gastaldi, Borgaro T.se (IT)

(73) Assignee: Comau S.p.A., Grugliasco (IT)

( * ) Notice: Subject to any disclaimer, the term of this patent is extended or adjusted under 35 U.S.C. 154(b) by 181 days.

(21) Appl. No.: 10/678,213

(22) Filed: Oct. 6, 2003

(65) Prior Publication Data

US 2004/0068333 A1 Apr. 8, 2004

(30) Foreign Application Priority Data

Oct. 4, 2002 (IT) ............................ TO2002A0863

(51) Int. Cl.
*G05B 15/00* (2006.01)
(52) U.S. Cl. ..................... 700/264; 700/61; 700/65; 700/66; 700/247
(58) Field of Classification Search ........ 700/245–259, 700/264; 361/71–75, 680, 683; 345/158, 345/161, 169, 1.2, 2.1; 318/568.1, 568.11, 318/568.24; 701/23; 901/2–3, 8–9, 23, 901/41–42, 49; 219/124.34; 714/15, 23–24
See application file for complete search history.

(56) References Cited

U.S. PATENT DOCUMENTS

| | | | |
|---|---|---|---|
| 4,757,459 A | * | 7/1988 | Lauchnor et al. ........... 700/264 |
| 5,136,222 A | * | 8/1992 | Yamamoto et al. ...... 318/568.2 |
| 5,332,322 A | | 7/1994 | Gambaro |
| 5,937,143 A | * | 8/1999 | Watanabe et al. ........... 700/264 |

(Continued)

FOREIGN PATENT DOCUMENTS

DE 199 51 233 A1 5/2000

(Continued)

OTHER PUBLICATIONS

Agapakis et al., Programming & control of multiple robotic devices in coordinated motion, 1990, IEEE, p. 362-367.*

(Continued)

*Primary Examiner*—Thomas Black
*Assistant Examiner*—McDieunel Marc
(74) *Attorney, Agent, or Firm*—Sughrue Mion, PLLC (57) ABSTRACT

A programming system for a robot or similar apparatus comprises a portable programming terminal (6) having a display device (D), a plurality of jog keys (14) for controlling the robot movements and a plurality of teaching keys (15–24, 26). The body of the terminal (6) comprises a first portion (11), wherein the jog keys (14) and the teaching keys (15–24, 26) are arranged, having a width which progressively decreasing until reaching the area of union with a second portion (10) of the body, wherein the display device (D) is positioned; the jog keys (14) comprises two series of keys (14) being positioned in a substantially symmetrical fashion to each other, each series being along a respective longitudinal side of the first portion (11), whereas the teaching keys (15–24, 26) are positioned within or close to the restricted zone of the body, bridging the first and the second portion (11, 10).

25 Claims, 3 Drawing Sheets

U.S. PATENT DOCUMENTS

| | | | |
|---|---|---|---|
| 6,134,102 A * | 10/2000 | Worn et al. ................. | 361/680 |
| 6,332,102 B1 * | 12/2001 | Nakajima et al. ........... | 700/245 |
| 6,356,806 B1 * | 3/2002 | Grob et al. ................. | 700/245 |
| 6,374,156 B1 * | 4/2002 | Shimogama et al. ....... | 700/245 |
| 6,488,425 B1 | 12/2002 | Spence et al. | |
| 6,522,949 B1 * | 2/2003 | Ikeda et al. ................. | 700/245 |
| 6,535,793 B2 * | 3/2003 | Allard ........................ | 700/259 |
| 6,560,513 B2 * | 5/2003 | Krause et al. .............. | 700/264 |
| 6,836,700 B2 * | 12/2004 | Greene et al. .............. | 700/245 |
| 6,845,297 B2 * | 1/2005 | Allard ........................ | 700/259 |
| 6,853,878 B2 * | 2/2005 | Hirayama et al. .......... | 700/245 |
| 6,853,881 B2 * | 2/2005 | Watanabe et al. ........... | 700/245 |
| 2004/0068335 A1 * | 4/2004 | Ferla et al. .................... | 700/86 |
| 2004/0260426 A1 * | 12/2004 | Johannessen et al. ....... | 700/245 |

FOREIGN PATENT DOCUMENTS

| EP | 0 310 958 A1 | 4/1989 |
|---|---|---|
| JP | 11 29 1186 | 10/1999 |

OTHER PUBLICATIONS

Fanuc Robotics, System R-J3 Controller, 1999, Internet, p. 1-2.*

Fanuc Robotics, iPendant, 2004, Internet, p. 1-2.*

Fanuc A new robot teach pendant with Internet Interface Fanuc i Pendant, 1997, Internet, p. 1.*

GmbH, KUKA robocell: A compact robotic cell for flexible laser cutting and welding, Internet, pp. 1-6.* iPendant, 2004-2005, Internet, p. 1-2.*

KUKA, Communicate implement diagnose modernize acquire move control program connect, 2005, Internet, p. 1-6.*

* cited by examiner

Fig_1

Fig_4

Fig. 3

PORTABLE TERMINAL FOR CONTROLLING, PROGRAMMING AND/OR TEACHING ROBOTS OR SIMILAR AUTOMATIC APPARATUSES

BACKGROUND OF THE INVENTION

The present invention relates to a portable control, program and/or teach terminal provided for the connection to a control unit of movements according to multiple axes of an automatic apparatus bearing a tool, such as a robot or similar, the terminal having a longitudinally extended body defining a first portion and a second portion comprising an area of union to the first portion, wherein in correspondence with a front side of the first portion a display device is provided and in correspondence with a front side of the second portion a multiplicity of keys is provided, said multiplicity comprising:

- a plurality of motion keys able to be operated manually to provide the control unit with a respective command signal for the apparatus, the command signal being aimed at causing the tool to execute a rotation or a translation motion about or along an axis corresponding to the operated motion key,
- a plurality of teaching keys, able to be operated manually for programming the control unit and/or controlling the apparatus and/or storing a position reached by a predefined point of the tool as a result of a motion of the apparatus.

The activity of programming a robot essentially consists in manually teaching the robot the trajectory which one of its points shall have to repeat automatically in order to execute a certain application. This point is constituted by the so-called "Tool Centre Point" (TCP), which identifies the position of the active part of the tool mounted on the wrist of the robot, i.e. the part of the tool that performs the operation, and that is defined by an operator in opportune fashion according to the application; in view of this, for instance in the case of an arc welding operation, the TCP is located on the tip of the welding torch at the end of the welding wire; in sealing applications, instead, the TCP is in correspondence with a nozzle for the outflow of the sealant, whilst for applications requiring an electrical spot welding gun the TCP corresponds to one of the two electrodes or to an intermediate point between them.

Most programming time is dedicated to commanding the robot manually, to identify the optimal points of the trajectory the TCP will have to follow, and to store their co-ordinates. For this purpose, a portable programming terminal is provided, known as the "teach pendant", which is connected to the robot control unit and typically comprises a display and a series of push-buttons used for programming and manually commanding the motion of the robot; the programming terminal is usually connected to the control unit by means of a long wire that allows the operator to move in proximity to the work area of the robot, to be able accurately to verify the points and trajectories of the TCP.

To command the variations to the posture of the robot manually, the operator uses specific push-buttons of the programming terminal, known as "jog" push-buttons or keys, which command the actuation of one or more axes of the robot.

Acting on the jog push-buttons of the portable terminal, the TCP can be actuated in a specific positive or negative direction within a reference system selected by the operator among a plurality of possible reference systems; for instance, typically a reference system of the robot joints, known as "Joints", is provided, where a vector in such a system represents the angular position of each of the joints; also provided are Cartesian reference systems, such as those usually known as "Base" and "Tool", the former referred to the base of the robot and the second one to the tool positioned at the end of the robot.

In order to follow the TCP closely and visually checking its positioning, the operator continuously moves around the robot; the operator thereby clearly also moves relative to the origins of the aforesaid reference systems, which complicates, to a certain extent, the programming activity, also in consideration of the fact that the operator, on each occasion, has to select the reference system (s)he desires to use; note on this point that, in order to reach the individual working points of the tool of the application to be successively stored, it is occasionally necessary to move multiple axes of the robot.

Use of prior art programming terminals is also generally awkward for the operator, due to the difficulty (s)he has in reaching some push-buttons with his/her fingers, unless (s)he continually changes the postures of his/her hands. In some cases, use of prior art programming terminals is even tiresome, due to the presence of a safety push-button (known as dead man device), which must be kept pressed while actuating the robot by means of the jog push-buttons.

SUMMARY OF THE INVENTION

The present invention has the aim of obtaining a portable programming terminal for a robot, or similar automatic apparatus, having a particularly advantageous structure from the ergonomic point of view, in order to facilitate and make less hard the programming activity.

Another aim of the invention is to obtain a terminal which makes the activity of programming a robot, or a similar automatic apparatus, by an operator simpler and more immediate than in prior art systems.

These and other aims, which shall become readily apparent hereafter, are achieved according to the invention by a portable terminal of the type indicated at the opening of the present description, characterised in that

- the second portion of the body of the terminal has a width which progressively decreases until reaching said area of union,
- at least one between said plurality of motion keys and said plurality of teaching keys comprises a first and a second series of keys being positioned each along a respective longitudinal side of the second portion, preferably in a substantially symmetrical fashion to each other, and
- the other between said plurality of motion keys and said plurality of teaching keys comprises a group of keys being positioned within or close to said area of union.

Due to the above features, the operator can support the terminal with both hands, in correspondence with the two longitudinal sides of the second portion, whilst allowing him/her to use the thumbs to press the more commonly used control, motion and storage keys, which are accordingly arranged along the oblique sides of the second portion and/or close to the most restricted area of the terminal body, bridging the first and the second portion.

In a preferred embodiment of the invention, the terminal provides for a safety device of the "dead man" type and that the body of the terminal comprises a rear part wherein a longitudinally extended recess is defined, from each of two opposite longitudinal sides of the recess projecting towards the interior of the recess an elongated button, each elongated button being part of the safety device. The recess and the elongated buttons thus serve as a grip area for the ends of the fingers of the operator, when he/she supports the terminal along one or both the lateral surfaces of the second portion; in this way, at least one of the two elongated buttons is necessarily pressed, in order to enable use of the robot motion keys, with the possibility of alternating the hands in the operation of the safety device and in any case to operate said device with a natural posture of the hands.

BRIEF DESCRIPTION OF THE DRAWINGS

Additional aims, characteristics and advantages of the present invention shall become readily apparent from the description that follows and from the accompanying drawings, provided purely by way of explanatory and non limiting example, in which:

FIG. 2 is a view of the front part of a portable programming terminal according to the invention;

DETAILED DESCRIPTION OF THE INVENTION

Figure 1:
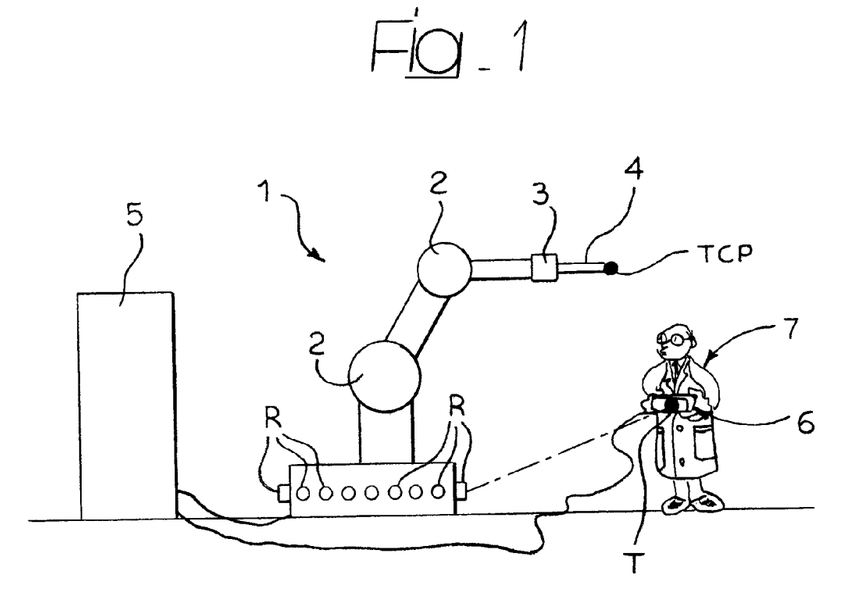
FIG. 1 is a schematic representation of a robot programming system according to the invention.

In FIG. 1, the reference number 1 designates a substantially known industrial robot, having a plurality of joints 2 and an end wrist 3 bearing a tool 4, which here is assumed to be a welding torch; as explained in the introductory part of the present description, the end of the tool 4 embodies the so-called "Tool Centre Point", or TCP. The robot 1 is connected, for example by means of an electrical cable, to a respective control unit 5; to the unit 5 is also connected a portable terminal 6, which is used by an operator 7 to program the robot 1.

The practical manners of constructing the hardware related to the unit 5 and to the terminal 6, preferably provided with respective microprocessor control system, are beyond the aims of the present description.

As explained previously, for programming purposes, the operator 7 "simulates" a working phase which the robot 1 shall later be called upon to executed in automatic, changing the posture of the robot by means of appropriate jog push-buttons provided on the terminal 6; through other push-buttons of the terminal 6, the operator 7 stores the co-ordinates of the optimal path identified for the TCP.

The system control logic provides for the jog push-buttons to command on each occasion translation function and rotation function of the axes of the robot 1 with reference to various possible reference systems (Joints, Base, Tool, etcetera) which the operator 7 has to select and select preventively on each occasion. This circumstance, as explained previously, makes the activity of programming with the terminal 6 hardly intuitive, also in consideration of the fact that the operator 7 continuously changes his/her operative position relative to the origins of the various reference systems that can be selected.

For this reason, according to an important aspect of the present invention, the terminal 6 is provided, in addition to the usual jog push-buttons, also of additional means for controlling the motion of the robot 1, means which are supported by a respective application programme residing in the control unit 5; said additional means, for instance in the form of push-buttons or of a joystick, are provided in order to control the displacement of the TCP in rapid, direct fashion, relative to a reference point which can advantageously correspond to the position of the operator 7, declared on each occasion to the control unit 5.

Figure 3:
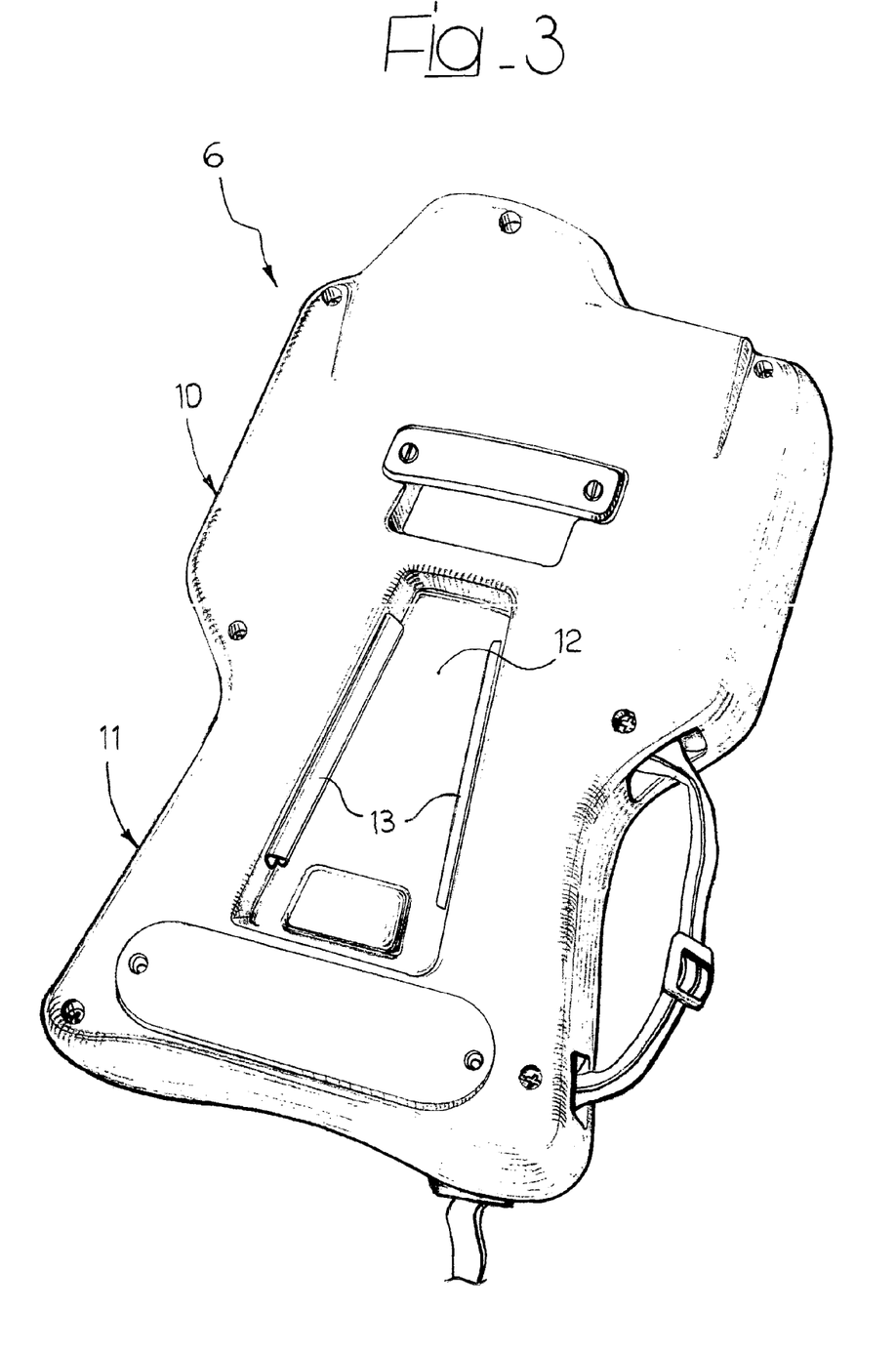
FIG. 3 is a view of the rear part of the terminal of FIG. 2.

FIGS. 2 and 3 show a programming terminal 6, comprising the additional motion control means, having a constructive structure that is particularly advantageous from the ergonomic point of view according to the invention.

From said figures it is possible first of all to note that, according to an important aspect of the present invention, the body of the terminal 6 comprises an upper portion 10, within which is located a display device D, and a lower portion 11, in which are positioned the push-buttons more frequently used for purposes of moving and programming the robot 1.

From said figures it is also readily apparent that, according to an important aspect of the present invention, the width of the lower portion 11 progressively decreases towards its area of junction to the upper part 10; said configuration of the body of the terminal 6 is extremely advantageous from an ergonomic point of view, because it allows the operator 7 to support the terminal itself with both hands, in correspondence with the two longitudinal sides of the portion 11, whilst allowing him/her to use the thumbs to press the more commonly used actuation and storage push-buttons, as will be readily apparent below.

As in the prior art, the terminal 6 is provided with a safety device, usually known as "dead man" device, which must be kept active by the operator 7 in order to enable the operation of the actuation push-buttons of the robot.

In a preferred embodiment of the invention, in the rear part of the body of the terminal 6 is centrally defined a longitudinally extended recess, designated as 12 in FIG. 3; from each of the longitudinal surfaces of the recess 12 projects, towards the interior of the recess itself, the button 13 of a respective push-button which is a part of the dead man device; as is readily apparent, the two buttons 13 are substantially in the shape of an elongated bar.

The recess 12 and the buttons 13 serve as a grip area for the ends of the fingers of the operator 7, but not the thumbs, when the operator supports the terminal 6 along one or both the inclined lateral surfaces of the portion 11; in this way, at least one of the two buttons 13 is necessarily pressed, in order to enable use of the robot actuation push-buttons; vice versa, if neither of the two buttons 13 is pressed, the terminal 6 does not allow to command the actuation of the robot 1.

This arrangement is particularly convenient for the operator, since it allows him/her to alternate the hands in the operation of the dead man device and in any case to operate said device with a natural posture of the hands; vice versa, prior art programming terminals generally entail such a static posture as to tire the hands of the operator, who therefore attempts to change the grip point on the terminal, without being able to find a comfortable one, due to the need of having to keep the dead man device pressed.

The fact that the bars 13 are relatively long and extend substantially parallel to the two lateral surfaces of the portion 11 also allows the operator to move the grip point along the portion 11 of the body of the terminal 6, always assuring a comfortable operation of the dead man device.

Returning to FIG. 2, the terminal 6 comprises usual jog push-buttons, for delivering the co-ordinates for the actuation of the robot in positive or negative direction in a reference system selected by the operator among those provided ("Joints", "Base", "Tool", etcetera), as explained above; the jog push-buttons are for this purpose of the dual pressure type, and thus each comprises a push-button 14 which must be pressed at a longitudinal end or at the other, to obtain respectively a movement in the positive direction or a movement in the negative direction.

In the preferred embodiment of the invention, the jog push-buttons 14 are positioned symmetrically on the front surface of the terminal 6, and in particular four at one side and four at the other; this arrangement, too, was selected for ergonomic reasons, because it favours a change in posture of the left hand and of the right hand of the operator 7 which would alternatively operate the push-buttons 13 of the dead man device present both to the left and to the right in the rear part of the terminal (see FIG. 3).

Preferably, moreover, on a same side (in the specific case of FIG. 2, the left side) are positioned the push-buttons 14 for controlling the translation functions and on the opposite side the push-buttons 14 for controlling the rotation functions; the purpose of this arrangement is to simplify finding the functions.

In the case exemplified herein the jog push-button comprise in particular two symmetrical series of four push-buttons, each comprising three upper push-buttons 14, substantially parallel to each other, respectively for controlling the axes 1–3 and 4–6 of the robot, and a lower push-button 14, substantially perpendicular to the previous ones, respectively for controlling the axes 7 and 8 of the robot. To the lower jog push-buttons 14 may also be attributed, as a second function, control over the axes 9 and 10 of the robot, if the latter has them.

The reference number 15 designates the keys of two "Override" push-buttons, used one to increase and the other to reduce the velocity of translation of the robot. The two buttons 15 are preferably positioned in the central part of the portion 11, on the right, in proximity to controls called "Start", "Hold" and "Coord" described hereafter.

The reference number 16 designates the key of a push-button called "Start", positioned on the right side of the terminal, in the upper part of the portion 11, in order to be conveniently operated with the thumb of the right hand; the push-button 16 is provided to start the motion of the robot 1 to perform a sequence of motions set previously by means of the jog push-buttons 14.

The reference number 17 designates the key of a push-button called "Hold", which allows to stop the motion of the robot 1; the key 17 is positioned in the immediate vicinity of the push-button "Start" 16 on the right side of the terminal 6.

The reference number 18 designates the key of a push-button called "Coord", used to select the method for actuating the robot, i.e. the reference co-ordinate system ("Base", "Tool", "Joints", etcetera) for the jog push-buttons, which is positioned in the vicinity of the push-buttons 14 towards the left side of the terminal 6.

The reference number 19 designates the key of a push-button called "Back": when it is pressed, the robot 1 repeats in reverse one or more previously commanded motions; it is located in the vicinity of the push-button "Start" 16, at the right side of the terminal 6.

The reference number 26 designates the key of an actuation push-button called "Step", used to make the robot 1 perform individual steps of a previously set sequence of motions; the key 26 too is located towards the right side of the terminal, so it can be pressed with the thumb of the right hand.

On the left side of the portion 11, in proximity to the area of union to the portion 10, are provided the push-buttons for programming the terminal 6. This positioning is provided to differentiate, from the spatial point of view, the programming push-buttons from the keys that are more closely linked with actuation, described above. In addition, the programming push-buttons require less operating precision that do actuation push-buttons and therefore can easily be selected with the left hand. In any case, it should be considered that the programming push-buttons are always used when the dead man device shown in FIG. 3 is not pressed and hence these push-buttons, too, can easily be operated with the thumb of the right hand, while supporting the terminal with the left hand.

The programming push-buttons comprise four cursor push-buttons, which in the case exemplified herein are covered by a single compass knob, designated as 20, and are used to navigate within a menu which can be displayed on the display D. The compass knob 20 is, as stated, on upper left side, on the outermost part of the terminal 6, in order to be easily reached with the thumb of the left hand.

Also for programming purposes are provided the keys of two push-buttons called "Rec" and "Mod", respectively designated as 21 and 22; the keys 21 and 22 are respectively used to record and modify a previously set point of the trajectory imposed to the TCP; they are preferably positioned on the left side of the terminal 6, near the cursor push-buttons of the compass knob 20.

The reference number 23 globally designates an alphanumeric keypad, whose operating mode is similar to that of portable telephones, positioned centrally and low in the portion 11; the keypad 23, used to input letters and numbers during the programming operations, can also be reached at the two sides using the thumbs of the two hands.

The keys designated as 24 and 25, called "Enter" and "Esc" relate to push-buttons used, together with the cursor push-buttons in the compass knob 20, to navigate or select an option from the menu shown on the display D; said keys 24 and 25 are vertically offset with respect to each other (key 24 below and key 25 above).

The reference number 27 designate the keys of push-buttons called "Shift", located at the sides of the display D in the portion 10 of the terminal 6; the keys 27 are used with continuous pressure simultaneously with other keys, such as the "Override" key 15, the compass knob 20, and the keys of the keypad 23.

The reference number 28 designates the key of a push-button called "Help", whose pressure allows to obtain help information on the display D, in relation to a menu selection; the key 28 is located in the lower part of the display D, in central position.

The reference number 29 designates the keys of two cursor push-buttons located in proximity to the compass knob 20, used to scroll through the pages visible on the display D.

The reference numbers TF1, TF2 and TF3 designate three series of keys assigned to activate specific functions, provided on the portion 10; the first and second series of keys TF1, TF2 are each positioned along a respective lateral edges of the display D, whilst the third series of keys TF3 is positioned along the lower edge of the display D.

The reference number 30 indicates the keys of two push-buttons called "More", located at the sides of the display D in the portion 10, which are used to activate additional functions attributed to the keys TF1 and TF2.

The reference numbers 31 and 32 respectively indicate a key selector and a mushroom head push-button, both located in the area at the upper end of the portion 10, the first to the left and the second to the right; the key selector 31 is used to activate or turn on the programming terminal 6, whilst the mushroom head push-button 32 is provided to be pressed by the operator in case of emergency, to stop the operation of the robot 1.

As mentioned previously, according to an important aspect of the invention the terminal 6 is equipped with a series of additional means for controlling the actuation of the robot 1, having the function of moving the TCP of the robot 1 in Cartesian fashion relative to a reference point chosen by the user 7. According to a possible embodiment of the invention, the following are provided for this purpose:

four push-buttons, covered by a single compass knob designated as 40, aimed at causing the movement of the TCP respectively towards, away, to the right or to the left relative to the position established by the operator 7, a double-pressed push-button, aimed at causing an upward or downward motion of the TCP, depending on whether its key 41 is pressed at a longitudinal end or at the other.

The keys 40 and/or 41 can also be assigned the function of determining a rotation of the TCP of the robot 1 relative to a reference point selected by the user 7; from this standpoint, the aforesaid keys 40, 41 may therefore be assigned a dual functionality and the terminal 6 shall be for this purpose provided with means for switching the operating mode of the auxiliary keys 40, 41 from "translation" to "rotation", and vice versa. In the latter operating mode, the four push-buttons of the compass knob 40 will for instance be aimed at causing the rotation of the TCP about a respective axis, respectively counter-clockwise and clockwise to the right, and in counter-clockwise and clockwise towards the position established by the operator 7; the push-button of the key 41 will be aimed at causing a rotation of the TCP about the respective axis counter-clockwise and clockwise upwards.

As FIG. 2 shows, both keys 40, 41 are positioned in the central area of the portion 11, between the two opposite series of jog push-buttons 14; the key 40 is preferably to the right of the key 41, so that the key 40 can be operated with the thumb of the right hand and the key 41 with the thumb of the left hand.

It should be stressed that, according to the invention, the auxiliary keys 40 and 41 are in addition to the jog push-buttons 14: therefore, the combination of the TCP to reach the desired point may always be commanded by the operator 7 using the individual jog push-buttons 14, after selecting a given reference system with the "Coord" push-button 18.

The motion of the TCP determined by the keys 40, 41, instead, is in no way influenced by the current setting of the jog push-buttons 14 ("Base", "Joints", "Tool", etcetera) and for the operator 7 it is sufficient to press one of such auxiliary keys 40, 41 to move the TCP in the desired direction.

As stated, the auxiliary keys 40, 41 can be operated by the operator 7 who grips the terminal 6 to allow the actuation of the TCP according to the three axes x, y, x, in space with respect to a variable reference point. Said reference point can advantageously be given by the position of the operator 7 who will thereby have the maximum sensitivity of the motion of the machine. Therefore, if the set reference point is the operator him/herself, and if the key 40 is pressed in correspondence with its rightward arrow, the TCP will be moved by the robot 1 to the right relative to the position of the operator 7; similar movements may be commanded to the left and to move the TCP closer or farther away from the operator 7 (respectively by pressing the key 40 in correspondence with its leftward, upward and downward arrows), or to raise or lower the TCP (pressing the key 41 respectively in correspondence with its upward arrow or in correspondence with its downward arrow).

If the "rotation" operating mode is set for the keys 40, 41 and the set reference point is the operator:

if the key 40 is pressed in correspondence with its right or left arrows, the TCP will be set in rotation respectively clockwise or counter-clockwise towards the position of the operator 7;

if the key 40 is pressed in correspondence with its up or down arrows, the TCP will be set in rotation respectively clockwise or counter-clockwise to the right;

if the key 41 is pressed in correspondence with its up or down arrows, the TCP will be set in rotation counter-clockwise or clockwise upwardly.

The definition of the initial reference point relative to which the actuation commanded by the auxiliary keys 40, 41 operates, is required from the operator 7, in order to allow the motions to be executed in the correct direction.

In a possible embodiment of the invention, the variable reference point is defined by the operator 7 by means of a page or screen which can be displayed on the display D of the terminal 6; from said page it will also be possible to switch the operating mode of the auxiliary keys 40, 41 from "translation" to "rotation", and vice versa.

Figure 4:
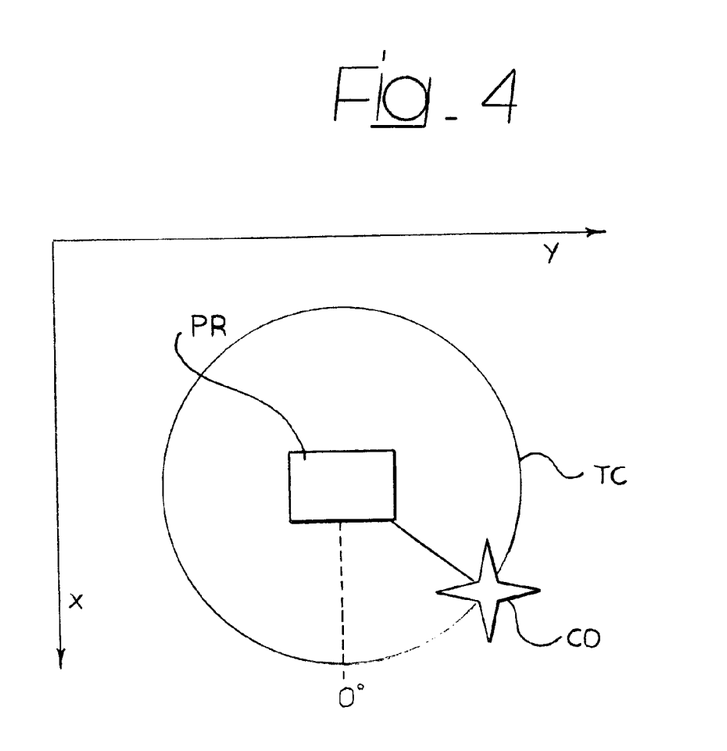
FIG. 4 is an example of a display screen usable for inputting an operative parameter of the terminal of FIG. 2.

FIG. 4 schematically shows a possible display screen usable for this purpose. The screen essentially consists of a graphic representation in which a cursor, indicated as CO, representative of the operator or of the terminal, can be moved along a circular trajectory TC about the robot, represented in the screen by the symbol PR. The displacement of the cursor CO along the trajectory TC can, for instance, be commanded by means of the right/left cursor keys in the compass knob 20; when the cursor CO reaches the desired position, the operator 7 will press a confirmation key, for instance the "Enter" key 24.

Preferably, the default condition of the system, also visible in the graphic screen of FIG. 4, provides for the operator (and hence the cursor CO) in position of 0° relative to the base of the robot, i.e. in a position equivalent to that of the Cartesian jog mode with "Base" co-ordinates.

From the above it is readily apparent that, through the use of the auxiliary keys 40, 41 the operator 7 need not preventively select a given reference system of the jog push-buttons 14 and then use the latter to command the movement of the robot 1; the operator 7 need only act on the dedicated keys 40, 41 to obtain the desired movement of the TCP relative to its observation point, after setting the initial reference point. The operator 7, who during the programming phase moves inside the operating area of the robot 1, can change in simple and rapid fashion his/her reference, based on his/her own angular displacement relative to the reference axis of the robot base, using the graphic screen shown in FIG. 4.

In a particularly advantageous embodiment of the invention, moreover, a system for the automatic self-learning of the position of the operator 7 by the control unit can be provided.

For this purpose, for example, the terminal 6 can be provided with a signal transmitter means; said transmitter means, schematically designated as T in FIG. 1, is appropriately dimensioned to have a working range of a few metres; and hence to fall within the field of action of the terminal 6 relative to the robot 1.

On the base of the robot 1, distributed over all or part of its perimeter, are provided a plurality of receiver means, able to receive a signal emitted by the transmitter means T present on the terminal 6; the receiver means positioned on the base of the robot are designated as R in FIG. 1.

The logic of the control unit 5 provides for a codified procedure that allows to discriminate which receiver means R receives the signal from the transmitter means T; through this procedure, which lasts a few seconds, the system can automatically recognise the angular displacement of the operator 7, in order to allow the operator to use the auxiliary keys 40, 41 to move the TCP of the robot 1 referred to the position occupied at that time by the terminal 6, in the ways described above. The aforementioned procedure can advantageously be activated from the terminal 6, for instance through a single dedicated push-button, to change reference during the programming phase, based on the different positions the operator 7 assumes relative to the robot 1.

Clearly, numerous variations to the programming system described by way of example are possible for those skilled in the art, without thereby departing from the novelty scope inherent in the inventive idea.

For example, with reference to the embodiment of the invention provided with system for the automatic recognition of the position of the terminal 6 relative to the robot 1, on the terminal 6 may be positioned a receiver means R and on the basis of the robot 1 may be positioned a plurality of transmitter means T, i.e. with an inverted configuration relative to the one shown in FIG. 1. The means aimed at allowing the aforesaid automatic position recognition could also be obtained with any known technique, for instance in the form of emitters/receivers of the infrared, optical, laser type, etcetera; with particular reference to the case of infrared transmitter/receiver means, in particular, the possibility is noted in particular of exploiting for this purpose the data transmission components of the IRDA® port, normally provided on most portable terminals for programming robots.

The software equipping the terminal 6 and the control unit 5 for the purposes of executing the functions described above may naturally be obtained in various manners, with techniques known in themselves to those skilled in the art.

What is claimed is:

1. A portable terminal provided for the connection to a control unit of movements according to multiple axes of an automatic apparatus bearing a tool, the terminal having a longitudinally extended body defining a first portion and a second portion comprising an area of union to the first portion, wherein in correspondence with a front side of the first portion a display device is provided and in correspondence with a front side of the second portion a multiplicity of keys is provided, said multiplicity comprising:

a plurality of motion keys able to be operated manually to provide the control unit with a respective command signal for the apparatus, the command signal being aimed at causing the tool to execute a rotation or a translation motion about or along an axis corresponding to the operated motion key, a plurality of teaching keys, able to be operated manually for programming the control unit and/or controlling the apparatus and/or storing a position reached by a predefined point of the tool as a result of a motion of the apparatus, wherein the second portion of the body of the terminal has a width which progressively decreases until reaching said area of union, said plurality of motion keys comprises a first and a second series of keys being positioned each along a respective longitudinal side of the second portion, preferably in a substantially symmetrical fashion to each other, and the said plurality of teaching keys comprises a group of keys being positioned within or close to said area of union.

2. The terminal as claimed in claim 1, the first series consists of keys for controlling translation movements and the second series consists of keys for controlling rotation movements.

3. The terminal as claimed in claim 2, wherein said additional motion control means can be operated to cause a displacement of the predefined point of the tool closer, farther away, to the right, to the left, upwards or downwards relative to the position of the terminal, and hence of the user who supports it.

4. The terminal as claimed in claim 1, the body comprises a rear part in which a longitudinally extended recess is defined, having two opposite longitudinal sides, each longitudinal side extending substantially parallel to a respective side surface of the second portion.

5. The terminal as claimed in claim 1, further comprising a safety device of the "dead man" type and the body comprising a rear part wherein a longitudinally extended recess is defined, from each of two opposite longitudinal sides of the recess a respective elongated button projecting towards the interior of the recess, each elongated button being part of the safety device.

6. The terminal as claimed in claim 1, further comprising selection means, able to be operated manually to select a desired co-ordinate system among a plurality of co-ordinate systems ("Base, "Tool", "Joints") stored in the control unit, that the operation of the motion keys depends on a selection made through the selection means and that said command signal is aimed at causing the tool to execute a rotation or a translation motion about or along an axis corresponding to the operated motion key, in the co-ordinate system ("Base, "Tool", "Joints") selected using the selection means.

7. The terminal as claimed in claim 6, further comprising additional motion control means, able to be operated manually instead of the motion control means, to provide the control unit with a respective signal for controlling the apparatus aimed at causing a displacement of the predefined point of the tool relative to a previously set reference point, where the position of the reference point is capable of being modified, the terminal comprises means for modifying the position of the reference point, the signal for controlling the apparatus generated as a result of the operation of the additional motion control means is independent from the co-ordinate system ("Base, "Tool", "Joints") selected through the selection means.

8. The terminal as claimed in claim 7, wherein said additional motion control means is positioned in a central part of the second portion.

9. The terminal as claimed in claim 7, wherein said additional motion control means is positioned between the first and the second series of motion keys.

10. The terminal as claimed in claim 7, wherein said additional motion control means is able to be operated to cause Cartesian displacements of the predefined point of the tools relative to the set reference point.

11. The terminal as claimed in claim 7, wherein said additional motion control means can be operated to cause angular or rotary displacements about a respective axis of the predefined point of the tools.

12. The terminal as claimed in claim 7, wherein the reference point is representative of the position of the terminal, and hence of a user who supports it, relative to the apparatus.

13. The terminal as claimed in claim 12, wherein said additional motion control means can be operated to cause a rotation of the predefined point of the tool about a respective axis, counter-clockwise or clockwise to the right, counter-clockwise or clockwise towards the position of the terminal and counter-clockwise or clockwise upwards.

14. The terminal as claimed in claim 12, wherein said additional motion control means comprise a compass knob able to be selectively operated in four lateral areas thereof to cause, in one of its operating modes, a displacement of the predefined point of the tool closer, farther away, to the right or the left relative to the position of the terminal.

15. The terminal as claimed in claim 14, wherein the compass knob can be selectively operated in four lateral areas thereof to cause, in an additional operating mode, a displacement of the predefined point of the tool about a respective axis, counter-clockwise and clockwise to the right and counter-clockwise and clockwise towards the position of the terminal.

16. The terminal as claimed in claim 12, wherein said additional motion control means comprise a dual pressure key, able to be operated selectively at its two end areas to cause, in an operating mode thereof, a displacement of the predefined point of the tool upwards or downwards relative to the position of the terminal.

17. The terminal as claimed in claim 16, wherein the dual pressure key can be selectively operated at two end areas thereof to cause, in an additional operating mode, a rotation of the predefined point of the tool about a respective axis, counter-clockwise or clockwise upwards.

18. The terminal as claimed in claim 7, wherein said means for modifying the position of the reference point comprises an information input page capable of being displayed on the display device.

19. The terminal as claimed in claim 7, wherein said means for modifying the position of the reference point comprise means for generating graphic information on the display device, the graphic information being representative of the position of the reference point relative to the robot (1).

20. The terminal as claimed in claim 19, wherein said means for generating graphic information comprise
means for generating on the display a first symbol, representative of the reference point,
means for generating on the display a second symbol, representative of the robot;
means for moving the first symbol relative to the second symbol using the first key, in particular along a substantially circular trajectory.

21. The terminal as claimed in claim 7, wherein said means for modifying the position of the reference point are part of a system for the automatic recognition of the angular position of the terminal relative to the apparatus.

22. The terminal as claimed in claim 21, wherein the automatic recognition system comprises signal emitter means and signal receiving means, the signal emitter means being operatively associated to one between the terminal and the robot and the signal receiver means being operatively associated to the other between the terminal and the apparatus.

23. The terminal as claimed in claim 1, wherein said group of keys comprises one or more keys selected in the group consisting of:
at least a key for varying the translation velocity of the robot, positioned in particular in the right part of the second portion, towards the centre thereof;
a key for starting a sequence of motions of the robot, positioned in particular in the right part of the second portion, towards the centre thereof;
a key for stopping a motion of the robot, positioned in particular in the right part of the second portion, towards the centre thereof;
a key for selecting a desired co-ordinate system among a plurality of co-ordinate systems, positioned in particular in the left part of the second portion, towards the centre thereof;
a repetition key, which, when pressed, causes the robot to trace back one or more previously executed motions, positioned in particular in the right part of the second portion, towards the centre thereof;
a key for commanding the execution of individual steps of a previously set sequence of motions of the robot, positioned in particular in the right part of the second portion, towards the centre thereof;
a plurality of programming keys positioned in particular in the left part of the second portion and comprising at least multiple cursor keys, a data recording key, a data modification key.

24. The terminal as claimed in claim 1, wherein in the first portion, laterally to the display device, are positioned one or more function keys.

25. The terminal as claimed in claim 1, wherein in correspondence with an end area of the first portion are positioned a key selector and a mushroom head safety push-button.

* * * * *